(12) United States Patent
Rothamel

(10) Patent No.: US 7,055,379 B2
(45) Date of Patent: Jun. 6, 2006

(54) METHOD AND APPARATUS FOR CHECKING THE UNIFORMITY OF A PNEUMATIC TIRE

(75) Inventor: Karl Rothamel, Ober-Ramstadt (DE)

(73) Assignee: Snap-On Equipment GmbH (DE)

( * ) Notice: Subject to any disclaimer, the term of this patent is extended or adjusted under 35 U.S.C. 154(b) by 107 days.

(21) Appl. No.: 10/732,624

(22) Filed: Dec. 10, 2003

(65) Prior Publication Data

US 2004/0118198 A1    Jun. 24, 2004

(30) Foreign Application Priority Data

Dec. 11, 2002   (DE) ................. 102 57 907

(51) Int. Cl.
   *G01M 17/02*   (2006.01)
(52) U.S. Cl. .............................. 73/146; 451/1
(58) Field of Classification Search .............. 73/146, 73/462; 301/63.101, 5.22; 451/1, 254
   See application file for complete search history.

(56) References Cited

U.S. PATENT DOCUMENTS

| | | | | |
|---|---|---|---|---|
| 3,678,761 A | * | 7/1972 | Blackburn | .................. 73/457 |
| 3,808,660 A | * | 5/1974 | Wik | ........................... 29/894.3 |
| 3,862,570 A | * | 1/1975 | Ongaro | ........................ 73/146 |
| 5,454,627 A | * | 10/1995 | Kawabe et al. | ............ 301/5.22 |
| 5,930,285 A | * | 7/1999 | Moller | ....................... 373/128 |
| 6,016,695 A | * | 1/2000 | Reynolds et al. | ............. 73/146 |
| 6,041,649 A | * | 3/2000 | Fembock | ..................... 73/146 |
| 6,581,448 B1 | * | 6/2003 | Kimbara et al. | ............. 73/146 |
| 6,595,053 B1 | * | 7/2003 | Parker | ......................... 73/462 |
| 6,663,190 B1 | * | 12/2003 | Kashiwai et al. | ...... 301/63.101 |

FOREIGN PATENT DOCUMENTS

| | | |
|---|---|---|
| DE | 197 31 486 | 1/1999 |
| DE | 100 19 387 A1 | 3/2002 |
| EP | 0 884 547 | 12/1998 |
| JP | 02248809 | 10/1990 |
| JP | 2001 141615 | 3/2001 |
| WO | WO 98/08070 A | 2/1998 |

* cited by examiner

*Primary Examiner*—Edward Lefkowitz
*Assistant Examiner*—Andre Allen
(74) *Attorney, Agent, or Firm*—Ostrolenk, Faber, Gerb & Soffen, LLP

(57) ABSTRACT

In a method and apparatus for checking the uniformity of a pneumatic tire of a vehicle wheel, first and second unbalance measuring operations are performed to determine unbalance vectors of the vehicle wheel, which are ascertained at differing wheel speeds and/or with differing tire pressures and the difference is formed between the unbalance vectors for evaluation of the uniformity of the tire.

19 Claims, 3 Drawing Sheets

METHOD AND APPARATUS FOR CHECKING THE UNIFORMITY OF A PNEUMATIC TIRE

CROSS-REFERENCES TO RELATED APPLICATIONS

This application claims the priority of German patent application Serial No 102 57 907.5 filed Dec. 11, 2002, the subject-matter of which is incorporated herein by reference.

FIELD OF THE INVENTION

The invention concerns a method and an apparatus for checking the uniformity of a pneumatic tire of a vehicle.

BACKGROUND OF THE INVENTION

One form of method and apparatus for checking the uniformity of a tire for a wheel of a vehicle such as a motor vehicle, as are to be found in DE 197 31 486 and EP 0 884 547, provide that a respective interferogram of the surface of the tire is produced prior to and after a change in the tire inflation pressure, using coherent radiation. The interferograms are displayed and information regarding tire defects which are possibly present is obtained from a comparison of the corresponding images. To record the interferograms the wheel carrying the tire to be checked is fitted as by clamping on a conventional wheel balancing machine as is typically used for example for motor vehicle wheels. Then, a checking head arranged on the balancing machine is moved towards the tire until reaching a predetermined checking distance therefrom, to record the interferograms. The interferograms in respect of the surface of the tire are then recorded in a segment-wise manner. Whenever the recording of a respective checking segment is concluded the wheel is further rotated by an amount corresponding to the length of the respective checking segment, by operation of the balancing machine. That procedure is repeated until the entire tire has been checked in that fashion.

The corresponding tire checking apparatus comprises a balancing machine, a compressed air device for altering the tire inflation pressure, a checking head, a positioning device for the checking head, a computer and a control device for the balancing machine in order to further rotate the wheel by an amount corresponding to the length of a checking segment. While a commercially available balancing machine is supplied together with a computer and a control device for setting the angular speed of the balancing machine, the air pressure device for altering the air pressure in the tire, the checking head and the positioning device for the checking head are items of additional equipment which have to be further provided by a workshop in order to be able to carry out that tire checking method.

In addition, tire uniformity measuring machines have long been known, with which it is possible to ascertain the spring characteristics of a tire in a condition of rolling under load, in three mutually perpendicular axial directions. Defects or structural flaws in the tire being investigated can also be determined from the tangential, radial and lateral forces which are ascertained in that way. Such a tire uniformity measuring machine is relatively large and, because of the amount of space that it requires, it is generally not to be found in most workshops so that it is usually not available to a motor vehicle tire fitter. Nonetheless, for safety reasons, it is desirable for such checking methods to be available prior to fitting a new or used tire, so that a possible defect on the tire can be discovered or substantially ruled out in good time.

SUMMARY OF THE INVENTION

An object of the present invention is to provide a method of checking the uniformity of a pneumatic tire for a vehicle, which is relatively uncomplicated and in particular gives rise to a low cost burden.

Another object of the invention is to provide a method of checking the uniformity of a pneumatic tire, which involves a simple operating procedure that can be implemented quickly and easily without necessitating complicated and expensive equipment.

Still another object of the present invention is to provide an apparatus for checking the uniformity of a tire as for a motor vehicle, which can operate on the basis of easily measured parameters of the tire in order thereby to simplify the constitution of the apparatus.

Yet a further object of the present invention is to provide a computer program for computer-aided execution of a method of determining the uniformity of a pneumatic tire.

Yet another object of the present invention is to provide a digital storage medium with control signals co-operable with a digital computer system for executing a pneumatic tire checking computer program.

In accordance with the principles of the present invention in the method aspect the foregoing and other objects are attained by a method according to the invention as set forth in herein.

As will be seen from a description hereinafter of a preferred embodiment of the method according to the invention, the method is based on the notion that, by means of a variation in respect of forces acting substantially symmetrically on the tire to be checked, in relation to an axis of rotation, a displacement of the main axis of inertia of the tire, which is caused by a defect or structural fault, is brought about, and that displacement is ascertained in differential determination of the unbalance of a wheel carrying the tire to be checked. It is only in the case of an ideal wheel or tire that the axis of rotation, the central axis and the main axis of inertia of the wheel coincide. An unbalance is to be found in any situation which differs from the ideal wheel or tire. That can be the case for example if the centering hole of the disk portion of a wheel, on which a tire to be checked is mounted, that centering hole establishing the axis of rotation of the wheel, is arranged outside the center, or if, by virtue of irregular distribution of mass of the tire or the wheel, the main axis of inertia of the wheel does not coincide with the central axis of the wheel, that is to say it is tilted or displaced with respect thereto. It will be appreciated that it is also possible for a conjunction of both factors, that is to say displacement and tilting of the main axis of inertia, to lead to the wheel suffering from unbalance. That wheel unbalance remains unchanged due to the change in air pressure and disappears in the difference-forming procedure. If, due to an increase in the forces acting at the wheel or tire, for example deformation caused by a defect or structural damage or weakness, for example a carcass rupture, on the tread surface or at the side walls of the tire, is formed or increased, or if such a deformation is reduced upon a reduction in the forces involved, then that results in a change in the distribution of mass of the tire or the wheel carrying the tire. Such a distribution of mass results in displacement, that is to say tilting and/or lateral shifting, of the main axis of inertia of the wheel, which can be detected by means of at least one respective operation for determining the unbalance prior to and after the variation in the forces acting on the tire.

In a first preferred embodiment of the checking method the variation in the forces acting on the tire is caused by a variation in the tire inflation pressure. Pressure forces act uniformly at the entire surface of the inside of the tire and accordingly pressure forces act symmetrically with respect to the central axis of the tire.

It is advantageous if the method in that preferred embodiment involves the following steps: a first measuring operation for measuring the forces acting as a consequence of unbalance of the wheel, with the tire being subjected to the action of a first internal pressure $P_1$, then ascertaining the unbalance from the measured forces in relation to angle of rotation, then storing the ascertained unbalance in the form of a first unbalance vector $U_1$, followed by a second measuring operation for measuring the forces acting due to unbalance of the wheel, with the tire being subjected to the action of a second internal pressure $P_2$ which is different from the first internal pressure $P_1$, ascertaining the unbalance from the forces freshly measured with a rotary angle relationship, storing the freshly ascertained unbalance in the form of a second unbalance vector $U_2$, and forming a difference from the two unbalance vectors $U_1$ and $U_2$. It will be appreciated in this connection that it is also possible to implement more than two unbalance measuring operations with different measuring conditions at the pneumatic tire, more particularly for example involving different inflation pressures therein.

With the checking method according to the invention, an operation for determining the static unbalances or the dynamic unbalances involved can be carried out for example by means of a commercially available wheel balancing machine.

In accordance with a second preferred embodiment of the method of the invention, a variation in the forces acting substantially symmetrically on the tire can also be afforded by a variation in the rotary speed used in the unbalance measuring operation. Upon such a variation in the rotary speed, the centrifugal forces acting on the wheel also alter.

It is advantageous with this second embodiment for the checking method according to the invention to comprise the following steps: a first measuring operation for measuring the forces acting due to unbalance of the wheel at a first rotary speed $D_1$, ascertaining the wheel unbalance from the forces measured with a rotary angle relationship, storing the ascertained unbalance in the form of a first unbalance vector $U_1$, a second measuring operation for measuring the forces acting due to the unbalance of the wheel at a second rotary speed $D_2$ which differs from the first rotary speed $D_1$, ascertaining the wheel unbalance from the forces which are freshly measured and which are related to rotary angle, storing the freshly ascertained unbalance in the form of a second unbalance vector $U_2$ and forming a difference from the unbalance vectors $U_1$ and $U_2$. It is also important with this method that at least two measurement operations are carried out at differing rotary speeds. Equally however it is possible to carry out more than two measuring operations for measuring the forces acting due to unbalance of the wheel, in which respect the wheel rotary speed can be continuously or virtually continuously increased or reduced or kept constant, during the measurement procedures.

In the checking method in accordance with this second embodiment it is also possible to carry out an operation for determining the static unbalances or the dynamic unbalances involved for example by means of a commercially available wheel balancing machine.

In accordance with a further preferred feature of the invention the pneumatic tire can be inflated in the first measuring run at a higher pressure than the nominal pressure thereof and in the second measuring run at its nominal pressure. As a result, after the checking operation, the tire is already at the desired pressure and it is thus possible to save on a further working operation involving letting out air after the checking procedure has been carried out.

In accordance with a further preferred feature of the invention, the difference of the two unbalance vectors is compared with a tolerance which is admissible in dependence on the wheel dimensions. In that way, tire evaluation can be effected, in dependence on the type of wheel involved, by virtue of the operation of forming the difference between the unbalance vectors from the first and second unbalance measuring operations.

Further in accordance with the invention in the apparatus aspect the foregoing and further objects of the invention are attained by an apparatus for checking the uniformity of a pneumatic tire of a vehicle wheel, including a wheel balancing machine comprising a rotary drive for a wheel for carrying a pneumatic tire to be checked, a drive control and at least one measurement value pickup means for measuring forces acting due to a wheel unbalance during the rotation thereof. The apparatus further includes an evaluation arrangement comprising a first means for ascertaining unbalance vectors from the measured forces and a second means for ascertaining the difference from the two unbalance vectors. Both static unbalance and the dynamic unbalance of the wheel can be appropriately ascertained by the use of a wheel balancing machine. Ascertaining dynamic unbalances provides information as to whether there is an asymmetrical distribution of mass of the wheel in relation to its axis of rotation in first and second planes of the wheel, which are perpendicular to the axis of rotation thereof, or provides information about the plane and the angular portion in which the corresponding accumulation or deficit of mass is to be found. The position of such an unbalance or possibly a static unbalance is preferably represented on a suitable display.

In a further preferred feature of the invention the apparatus has a means for supplying gas under pressure for inflating the tire to a preselected pressure value. That pressurised gas supply means provides that the tire can be subjected to a pressure or various preselected pressures either manually or by means of an automatic control arrangement, for example an electronic control system.

In a further preferred feature of the invention the rotary drive and the drive control are so designed that the rotary speed of the wheel can be varied. The variation in rotary speed can optionally be implemented either manually or by means of an automatic control arrangement such as an electronic control system. The rotary speed can further be varied stepwise between the measurement operations or continuously or virtually continuously during a continuous or virtually continuous measurement operation.

The evaluation arrangement is preferably a component part of a digital computer system. It may further include the electronic control system for selecting the required tire inflation pressure and/or the automatic control arrangement for selecting the rotary speed during an unbalance measuring operation.

In accordance with the invention the foregoing and other objects are further attained by a computer program for computer-aided execution of the following method steps: reading in first measurement values of the forces acting due to an unbalance of a wheel during rotation thereof on measurement value pickup means of a wheel balancing machine, ascertaining the unbalance from the read-in measurement values, storing the ascertained unbalance in the form of a first unbalance vector $U_1$, reading in second values in respect of the forces acting due to an unbalance of the wheel during rotation thereof on the measurement value pickup means of the wheel balancing machine, ascertaining the unbalance from the freshly read-in measurement values, storing the freshly ascertained unbalance in the form of a second unbalance vector $U_1$ and forming a difference from the two unbalance vectors.

In a further preferred feature of this aspect of the invention the computer program is adapted for carrying out the method steps of outputting a control signal for setting a rotary speed at a rotary drive of the wheel balancing machine and/or outputting a control signal for setting a tire inflation pressure at a compressed air supply means.

Further objects, features and advantages of the invention will be apparent from the description hereinafter of preferred embodiments thereof.

DESCRIPTION OF PREFERRED EMBODIMENTS

Figure 1:
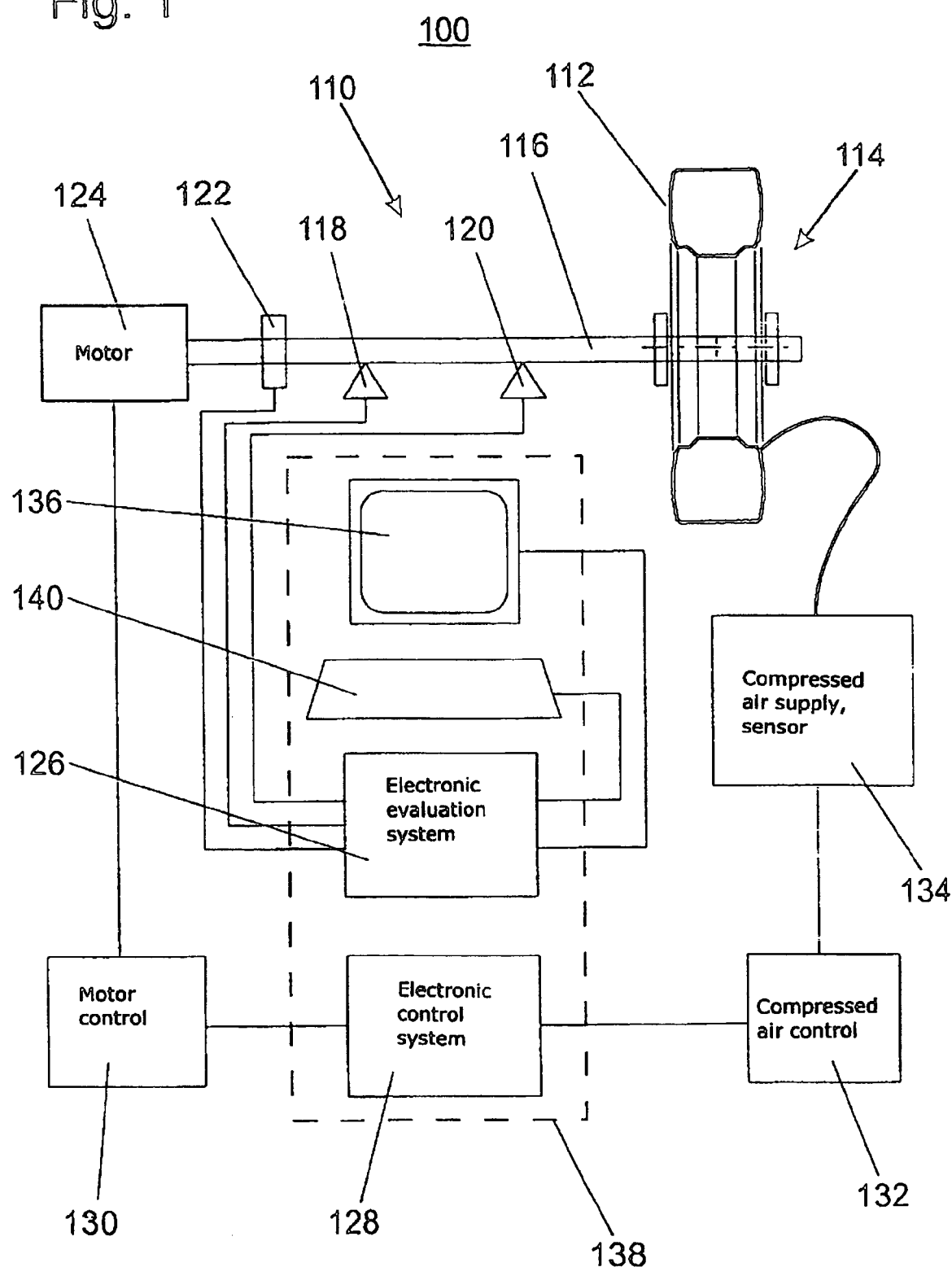
FIG. 1 is a diagrammatic view of a first embodiment of a checking apparatus according to the invention.

Referring firstly to FIG. 1, reference 100 therein generally denotes a checking apparatus according to the invention which includes a wheel balancing machine as diagrammatically indicated at 110, on which a wheel 114 having a tire 112 to be checked is suitably mounted as by a clamping arrangement. Disposed along a drive shaft 116 of the balancing machine 100 are first and second force sensors 118 and 120. This embodiment further has an angle measuring device 122. The drive shaft 116 is driven in rotation by a motor 124 which is typically an electric motor. Rotation of the drive shaft 116 with the tire 112 and the wheel 114, by virtue of a static and/or dynamic unbalance of the tire 112 and wheel 114, causes a vibratory or wobble tendency on the part of the wheel, and the effect of the force of which is transmitted to the drive shaft 116 by virtue of the rigid connection between the wheel/tire assembly and the drive shaft, and is thus recorded by the sensors 118 and 120. The associated signals thus produced by the sensors 118 and 120 are passed to an electronic evaluation arrangement 126. The electronic evaluation arrangement 126 also receives an information signal about the respect angular position of the wheel, which is detected by means of the angle measuring device 122 and the drive shaft 116. The rotary angle reference for the force measuring procedure is derived therefrom and the position of the unbalance vectors accordingly determined.

It will be noted however that measurement of the forces acting due to the unbalance of the wheel 114 with tire 112 at a drive shaft of the balancing machine can also be implemented in a different fashion. For example, it is possible to ascertain two linearly independent force components by means of two respective different measurement value pickup means which are arranged for example at the shaft displaced through 90°, and it is thus possible therefrom, with knowledge of the rotary speed used, to ascertain both the strength and also the rotary angular relationship or direction of the unbalance vectors.

When a measuring operation for measuring the forces caused by the unbalance of the wheel 114 with tire 112, in one fashion or another, is concluded, then a control signal can be delivered by an electronic control system 128 to a motor control 130, thereby causing the motor control 130 to set a different rotary speed $D_2$ at the motor 124. Alternatively or in parallel therewith, a control signal can be delivered by the electronic control system 128 to a compressed air control 132, which causes a compressed air supply 134 to vary the gas pressure in the tire 112. If the motor control 130 and/or the compressed air control 132 signal that the preselected motor speed $D_2$ or the preselected tire pressure $P_2$ has been set, a fresh measuring operation is started. As in the first measuring operation the sensors 118, 120 and the angle measuring device 122 detect the force components which are transmitted to the drive shaft 116 and transmit the resulting measurement values to the electronic evaluation system 126.

The second measuring operation can be followed by further measuring operations depending on the respective programming of the electronic evaluation and control systems 126 and 128.

The electronic evaluation system 126 is so set up that it can ascertain the unbalance of the wheel 114 on the one hand from the measured force components and the associated angular measurement, and outputs that unbalance, for example in the form of vectors $U_1$, $U_2$ and so forth, to a display 136 and/or for storage purposes. The electronic evaluation system 126 is further so designed that it subtracts the vectors $U_1$, $U_2$ and so forth ascertained from the two or also more measurement operations from each other and outputs the result to the display or for storage purposes.

The electronic evaluation system 126 and the electronic control system 128 can be component parts of a digital computer system indicated at 138, in which case the incoming measurement signals and the outgoing control signals are inputted and outputted respectively for example by way of a serial or parallel interface. The selection of the rotary speed and/or tire pressure, as well as the number of measurement operations to be carried out overall, can be for example individually preselected and inputted by way of a keyboard diagrammatically indicated at 140, or can be selected in accordance with the parameters which are suitably preset in an automatic programming procedure.

Figure 2:
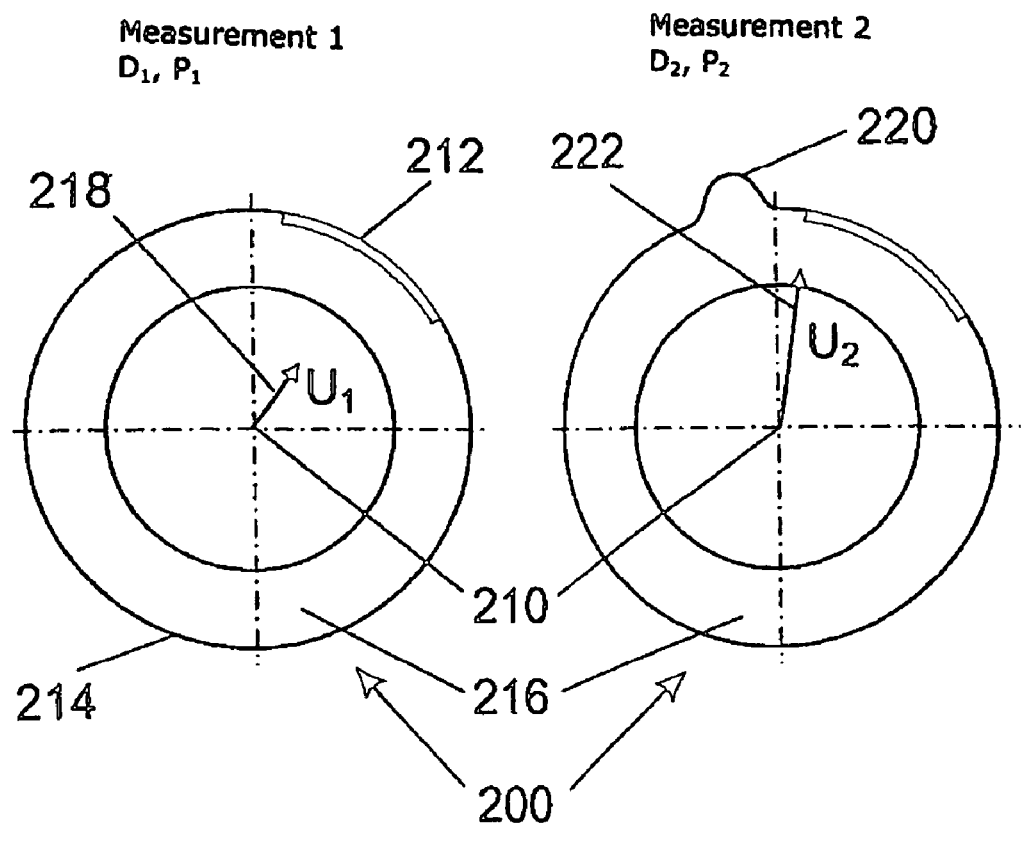
FIG. 2 is a diagrammatic view of the procedure for ascertaining a tire defect on the tread surface of a tire.
Figure 2:
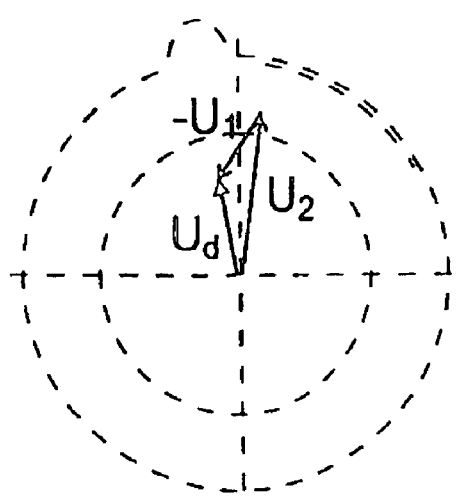
Figure 3:
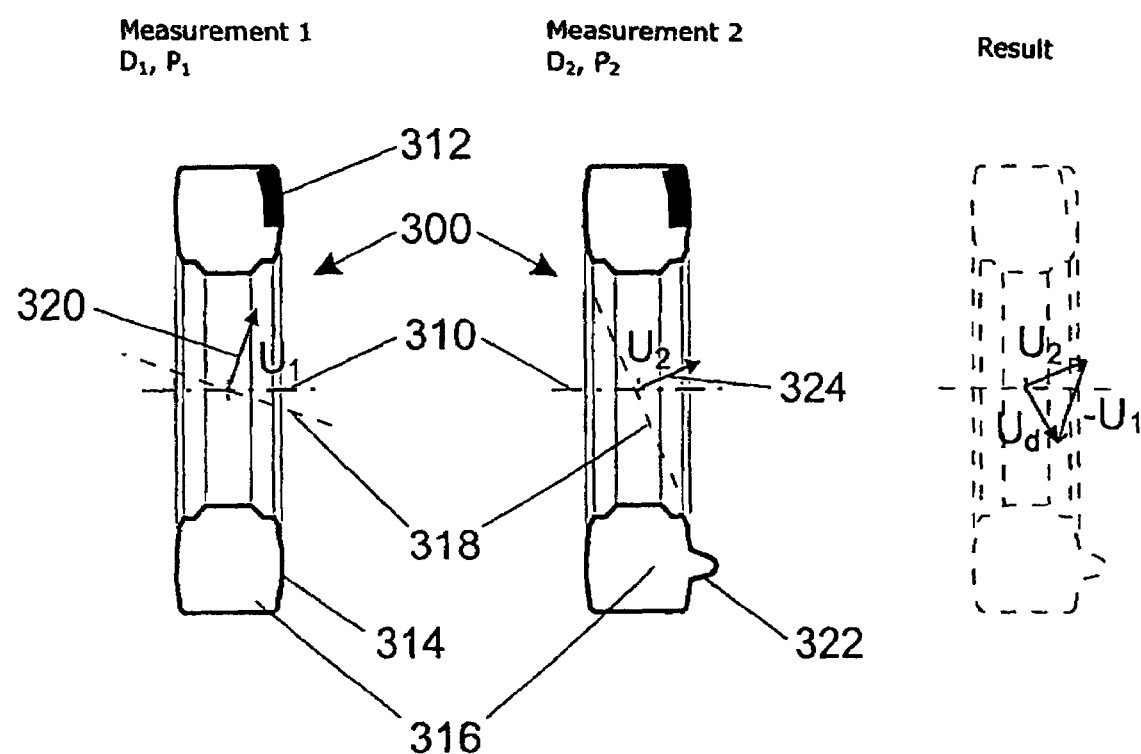
FIG. 3 is a diagrammatic view of the procedure for ascertaining a tire defect at the side wall of a tire.

Reference will now be made to FIGS. 2 and 3 showing two examples of the way in which the ascertained values in respect of the unbalance of a wheel carrying a tire to be checked can be employed by subtraction of the vectors $U_1$ and $U_2$ to ascertain a displacement of the main axis of inertia of the tire, caused by a possible defect in the tire. FIG. 2 diagrammatically shows the measurement results of the unbalance and the result in a sectional plane through a wheel as indicated at 200 perpendicularly to an axis of rotation 210 which in the illustrated example coincides with the central axis. As shown in FIG. 2, there is an increase in mass diagrammatically indicated at 212 by a thickened line, caused for example by an accumulation of material, at the peripheral surface 214 of a tire 216 to be checked. In a measurement 1 in which the tire is subjected to a pressure $P_1$ and which is implemented at a rotary speed $D_1$, that results in an unbalance indicated at $U_1$, that is to say a shift of the main axis of inertia of the wheel 200 with respect to the axis of rotation 210 thereof, by the length of the vector 218 which, as will be appreciated, is shown on an exaggerated scale. In a second measurement 2 which is implemented either with an increased pressure $P_2>P_1$ or an increased wheel rotary speed $D_2>D_1$ or both, a deformation 220 is formed due to a defect, for example a weakening in the structure of the tire, in the tread surface 214 of the tire. That deformation 220 results in a change in the distribution of mass in respect of the tire. Taking the unbalance $U_2$ ascertained in that way in measurement 2, it is possible to ascertain the position of the main axis of inertia of the wheel with respect to the central axis thereof or in this case also the axis of rotation 210, represented by a vector 222. The difference between the two ascertained unbalance vectors $U_2-U_1$ gives a vector $U_d$ which indicates the displacement, caused by the defect, of the main axis of inertia of the tire, which was brought about by the increase in pressure and/or rotary speed. Preferably the vector $U_1$ is subtracted from the vector $U_2$ if the pressure and/or the rotary speed were increased in the second measurement run in comparison with the first measurement run, in that case more specifically the difference vector $U_d$ points in the direction of the defect.

Reference will now be made to FIG. 3 illustrating a further measurement procedure by way of example in accordance with the method of the invention for ascertaining a defect at a side wall of a tire when there is a dynamic unbalance in respect of the wheel generally indicated at 300. The wheel 300 is shown in a diagrammatic cross-sectional view parallel to the axis of rotation 310 thereof. In this example, the axis of rotation 310 also coincides with the central axis of the wheel. An increase in mass diagrammatically indicated by the thicker line at 312 in FIG. 3, at a side surface 314 of the tire 316, causes tilting of the main axis of inertia 318 with respect to the axis of rotation 310. That results in an unbalance indicated at $U_1$ which is reproduced by a vector indicated at 320. While the first measurement procedure was performed at a tire pressure $P_1$ and a rotary speed $D_1$, a second measurement procedure takes place with an increased tire pressure $P_2>P_1$ and/or an increased rotary speed $D_2>D_1$. A deformation indicated at 322 in the central part of FIG. 3 is thus formed due to the resulting increased forces acting on the tire 316. That deformation 322 in turn results in a change in the distribution of mass of the tire and thus a shift or tilt of the main axis of inertia of the tire. The altered position of the main axis of inertia is represented by the ascertained unbalance $U_2$, as indicated by the vector 324. A vector $U_d$ afforded by forming the difference between the two vectors $U_2-U_1$ reproduces the displacement caused by the defect, in this case a tilting movement, of the main axis of inertia.

It will be appreciated that it is possible in this way to detect any other tilting or shift and in particular a combination of tilting and shift of the main axis of inertia of the tire. In that sense therefore the broad term displacement is used to denote any combination of tilting and shift movements.

It will be appreciated that the above-described embodiments of the method and apparatus according to the invention have been set forth solely by way of example and illustration of the principles of the invention and that various modifications and alterations may be made therein without thereby departing from the spirit and scope of the invention.

What is claimed is:

1. A method of checking the uniformity of a pneumatic tire of a vehicle wheel, comprising
   measuring an unbalance of the vehicle wheel in a first measuring operation;
   measuring an unbalance of the vehicle wheel in a second measuring operation after the first unbalance measuring operation wherein
   at least one of wheel speed and internal tire pressure during the first measuring operation are different from at least one of wheel speed and internal tire pressure during the second measuring operation;
   ascertaining first and second unbalance vectors of the vehicle wheel with the tire, during the first and second measuring operations and
   determining a difference between the two unbalance vectors to evaluate the uniformity of the tire.

2. A method as set forth in claim 1 including
   the first measuring operation for measuring forces acting due to wheel unbalance with the tire being at a first internal pressure, ascertaining the unbalance from the measured forces, storing the ascertained unbalance in the form of a first unbalance vector,
   the second measuring operation for measuring forces acting due to wheel unbalance, with the tire being at a second internal pressure differing from the first internal pressure,
   ascertaining the unbalance from the freshly measured forces measured in the second measuring operation,
   storing the freshly ascertained unbalance in the form of a second unbalance vector, and forming a difference from the first and second unbalance vectors.

3. A method as set forth in claim 1 including
   the first measuring operation for measuring forces acting due to wheel unbalance at a first rotary speed, ascertaining the unbalance from the measured forces,
   storing the ascertained unbalance in the form of a first unbalance vector,
   the second measuring operation for measuring forces acting due to wheel unbalance at a second rotary speed differing from the first rotary speed,
   ascertaining the unbalance from the freshly measured forces measured in the second measuring operation,
   storing the freshly ascertained unbalance in the form of a second unbalance vector, and forming a difference from the first and second unbalance vectors.

4. A method as set forth in claim 1 wherein
   the measuring is implemented in the form of a dynamic unbalance measuring operation for ascertaining unbalance of the wheel with the tire thereon.

5. A method as set forth in claim 1 wherein
   the unbalance vectors are ascertained in the first and the second measuring operations, and
   the tire is inflated at a higher pressure than a nominal pressure in the first measuring operation and is inflated at the nominal pressure in the second measuring operation.

6. A method as set forth in claim 1 wherein the difference between the first and the second unbalance vectors is compared with a tolerance which is admissible in dependence on the wheel dimensions.

7. Apparatus for checking the uniformity of a pneumatic tire of a vehicle wheel, including
   a wheel balancing machine comprising a rotary drive for a wheel for receiving the tire to be checked, a drive control for the drive, and at least one measurement value pickup operable for measuring forces acting due to an unbalance of the wheel during the rotation thereof, and
   an evaluation arrangement comprising a first device for ascertaining first and second unbalance vectors from the measured forces in the first and the second measuring operations with a difference in at least one of the wheel speed and the tire inflation pressure in the first and the second measuring operations, and a second device for ascertaining the difference of the unbalance vectors to evaluate the uniformity of the tire.

8. Apparatus as set forth in claim 7, further including
a device operable for controlling the wheel balancing machine to perform the first measuring operation at a first parameter in respect of at least one of the wheel speed and the tire pressure and to perform the second measuring operation at a second parameter in respect of at least one of the wheel speed and the tire pressure, wherein the parameters are different from each other.

9. Apparatus as set forth in claim 7, further including a gas supply operable for supplying gas under pressure for inflating the tire at a preselected value.

10. Apparatus as set forth in claim 7
wherein the rotary drive and the drive control are so adapted that the rotary speed of the wheel is variable.

11. Apparatus as set forth in claim 7 wherein the wheel balancing machine further includes a measurement value pickup means for measuring the angular position of the wheel and wherein the first means of the evaluation arrangement is adapted to ascertain unbalance vectors from the measured forces and the measured angular position.

12. Apparatus as set forth in claim 7
wherein the evaluation arrangement further includes a display.

13. Apparatus as set forth in claim 12 further comprising
a digital computer system wherein the evaluation arrangement is a component part of the digital computer system.

14. A computer program for computer-aided execution of the method steps
reading in first measurement values of forces acting due to unbalance of a vehicle wheel with a tire during rotation thereof on measurement value pickups of a wheel balancing machine, wherein the rotary speed of the wheel and the inflation pressure of the tire have first values,
ascertaining the unbalance from the read-in measurement values,
storing the ascertained unbalance in the form of a first unbalance vector,
reading in second measurement values of forces acting due to unbalance of the vehicle wheel during rotation thereof on the measurement value pickups of the wheel balancing machine, wherein at least one of the rotary speed of the wheel and the inflation pressure of the tire have second values which are different from the first values,
ascertaining the unbalance from the second measurement values which are freshly read in,
storing the freshly ascertained unbalance in the form of a second unbalance vector, and
forming a difference from the two unbalance vectors.

15. A computer program as set forth in claim 14 and further adapted to carry out the method step of outputting a control signal for setting a tire pressure at a compressed air supply means.

16. A computer program as set forth in claim 14 and further adapted to carry out the method step of outputting a control signal for setting a rotary speed at a rotary drive of the wheel balancing machine.

17. A computer program as set forth in claim 14 and further adapted to carry out the method steps of reading in first and second measurement values in respect of an angular position.

18. A computer program as set forth in claim 14 and further adapted to carry out the method step of outputting a signal for displaying the position of a tire defect with respect to the wheel.

19. A digital storage medium with electronically readable control signals co-operable with a digital computer system for execution of a computer program, the computer program executing steps comprising
reading in first measurement values of forces acting due to unbalance of a vehicle wheel with a tire during rotation thereof on measurement value pickup of a wheel balancing machine wherein the rotary speed of the wheel and the inflation pressure of the tire have first values,
ascertaining the unbalance from the read-in measurement values,
storing the ascertained unbalance in the form of a first unbalance vector,
reading in second measurement values of forces acting due to unbalance of the vehicle wheel during rotation thereof on the measurement value pickup of the wheel balancing machine, wherein the rotary speed of the wheel and the inflation pressure of the tire have second values which are different from the first values,
ascertaining the unbalance from the second measurement values which are freshly read in,
storing the freshly ascertained unbalance in the form of a second unbalance vector, and
forming a difference from the two unbalance vectors.

\* \* \* \* \*